Dec. 28, 1965     M. S. BRODRICK     3,225,739
AGRICULTURAL DAIRY ESTABLISHMENT
Filed Nov. 5, 1963     3 Sheets-Sheet 1

INVENTOR
MERRILL S. BRODRICK

BY *Sherman Levy*     ATTORNEY

INVENTOR
MERRILL S. BRODRICK
ATTORNEY

Dec. 28, 1965  M. S. BRODRICK  3,225,739
AGRICULTURAL DAIRY ESTABLISHMENT
Filed Nov. 5, 1963  3 Sheets-Sheet 3

INVENTOR
MERRILL S. BRODRICK

BY *Sherman Levy* ATTORNEY

з,225,739
AGRICULTURAL DAIRY ESTABLISHMENT
Merrill S. Brodrick, 58 College Ave., Mansfield, Pa.
Filed Nov. 5, 1963, Ser. No. 321,615
8 Claims. (Cl. 119—27)

The present invention relates to a dairy establishment whereby milk can be obtained from cows in the most efficient and advantageous manner, and is a continuation-in-part of patent application Serial No. 210,449, now Patent No. 3,168,888, filed July 17, 1962.

An object of the present invention is to provide a dairy establishment wherein there is utilized a controlled nutritional program, and wherein the cows may be maintained in a confined, caged arrangement, and wherein according to the present invention there is provided an improved waste disposal system and an improved ventilation system, and wherein there is also utilized and provided tapered elevated stalls for the cows.

Another object is to provide a dairy establishment which utilizes automatic unlimited self feeding means, and wherein there is provided elevated cow stalls for permitting important labor savings and economies to be accomplished, and wherein there is also insured and provided improved sanitation, and wherein by means of the centralized integrated system of the present invention, the dairy establishment can be located in the most advantageous areas such as the populated areas due to the use of the closed centralized building, and wherein the milk that is produced will have improved characteristics as to wholesomeness, safety, sanitation and the like.

Another object is to provide a dairy establishment which will permit animals such as cows to be housed, fed, and handled in the most efficient manner as, for example, in regard to supply of air, feed and water to the animals, and also with regard to the removal of foul air, waste material from the animals, and wherein when the animals being handled are cows, the production of milk can be accomplished in the most efficient or desirable manner.

Another object is to provide a dairy establishment of the character described so that it can be utilized conveniently by operators or personnel, and further objects and advantages are to provide improved elements and arrangements thereof in an establishment of the character described that is economical to produce, durable in form, and conducive to the most economical use of materials and uniformity of members formed therefrom.

Still further objects and advantages will become apparent in the subsequent description in the specification.

Figure 1:
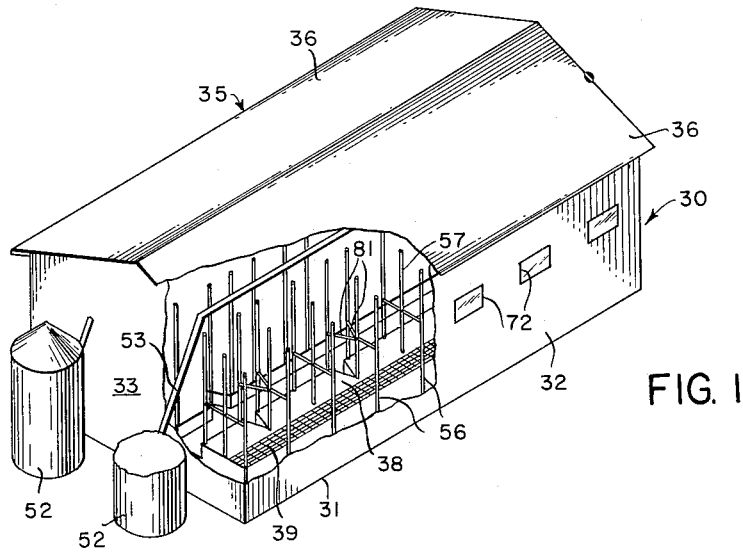
FIG. 1 is a perspective view illustrating the dairy establishment of the present invention, and with parts broken away for clarity of illustration.
Figure 2:
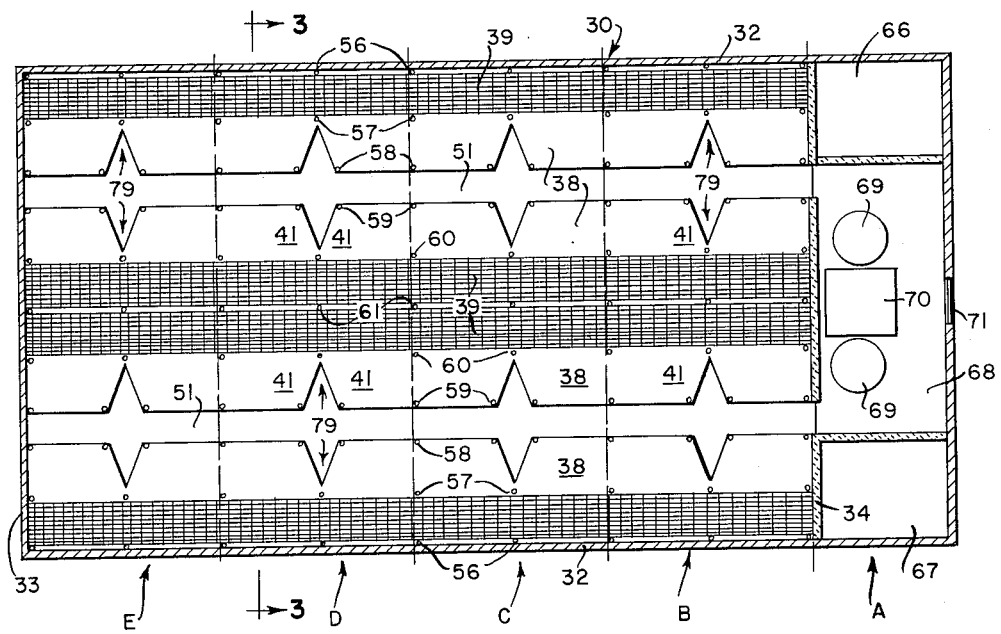
FIG. 2 is an enlarged horizontal sectional view taken through the building.
Figure 3:
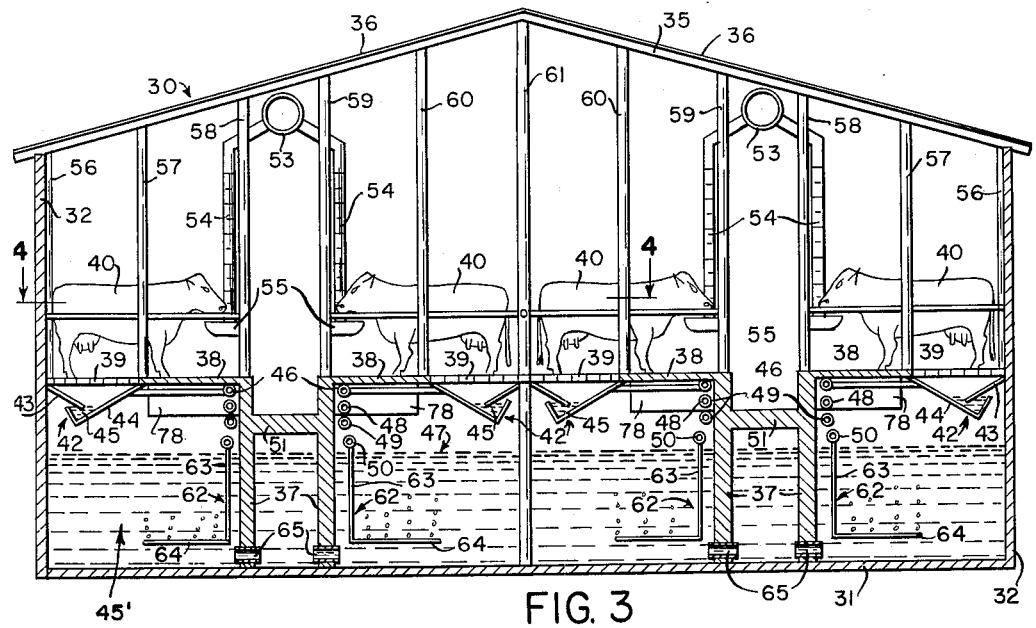
FIG. 3 is an enlarged vertical sectional view taken generally on the line 3—3 of FIG. 2.

Referring in detail to the drawings, and more particularly to FIGS. 1 through 4 and FIG. 6, the numeral 30 indicates the automated dairy establishment or building which includes a horizontally disposed bottom wall 31, spaced parallel vertically disposed side walls 32, end walls such as the end walls 33 and 34, a roof 35 which may include inclined sections 36, as for example as shown in FIG. 3. There is further provided spaced parallel vertically disposed wall members 37 which are arranged above the bottom wall 31, and horizontally disposed floor sections 38 are arranged at right angles with respect to the upper ends of the wall members 37. As shown in the drawings, horizontally disposed gratings or slatted floor sections 39 are arranged so that they are coplanar with respect to the floor sections 38, and the numeral 41 indicates the individual elevated stalls for the animals such as the cows 40.

Arranged below the gratings 39 are traps which are indicated generally by the numeral 42, and the traps 42 are adapted to consist of members 43 and 44, and the member 44 may have a generally L-shape for maintaining a quantity of liquid such as water 45 therein, and this water may be supplied from a suitable source of supply through the conduit or pipe 46.

The lower portion of the building 30 is shaped to include a hollow compartment or fluid reservoir or tank 47 for holding a quantity of liquid such as water 45' therein, and the water in the tank 47 results from overflow from the traps 42.

As shown in FIG. 3 there is also provided conduits or pipes 48, 49 and 50 and these conduits may function as vacuum, milk, or air lines or conduits respectively.

There is further provided horizontally disposed aisles or walk spaces 51 and the aisles 51 are arranged at a lower level than the bottoms of the stalls 41.

As shown in FIG. 1, suitable feed bins or storage tanks 52 may be arranged in a suitable location such as adjacent an end of the building 30, and conveyors or augers 53 are adapted to convey or transport feed from the bins 52 into the building 30 whereby the feed can enter each of the plurality of graduated tubes 54 and this feed can then be received in feed troughs 55 which are adapted to permit the self feeding of the cows 40.

As shown in FIG. 3, vertically disposed spaced parallel posts 56, 57, 58, 59, 60 and 61 are arranged in the building 30 and extend between the floor of the stalls and the roof 35 and these posts may be of different lengths as desired or as is necessary.

The air line or conduits 50 are adapted to have L-shaped tubular members 62 depending therefrom, and these members 62 include vertically disposed portions 63 and horizontally disposed lower portions 64, and the portions 64 have a plurality of apertures or openings therein whereby the air which is supplied from a suitable source of supply can bubble up through the liquid 45'.

There is provided in the lower portions of the wall members 37, hollow bushings or channel members 65 which are adapted to permit the fluid or water 45 to circulate therethrough in the desired manner.

The building 30 may be provided with compartments such as the compartments 66, 67 and 68 in one end thereof, FIG. 2, and these compartments or rooms can be used for any desired purpose. For example the area 66 can be used to hold milk storage equipment and the like, or as storage space for various types of equpment, while the area 68 can be used to hold milk processing machinery, pasturizers, milk separators, cleaners, tanks or any other such accessories. The building is also adapted to be provided with doorways such as the doorways 71 as well as windows 72 and these may be arranged wherever necessary.

Figure 6:
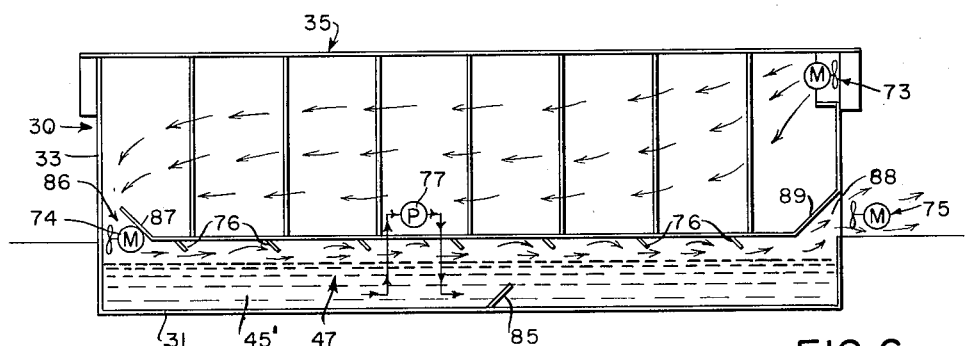
FIG. 6 is a schematic longitudinal sectional view illustrating schematically the ventilation and waste disposal mechanism.

With reference to the ventilation system, for the present invention, attention is directed to FIG. 6 and it will be seen that a plurality of motor driven fans or blowers 73, 74, and 75 are adapted to be used so that the air will follow the path indicated by the arrows in FIG. 6 in order to accomplish the desired results. Thus, the motor driven fan or blower 73 is adapted to be arranged adjacent an upper end portion of the building so that the fresh air will be sucked into the building and blow throughout the building in order to provide fresh air for the cows and the like in the building, and this air will then be circulated or moved by the fan 74 so that the air will flow across the top of the body of water 45' and will be sucked out as foul air by the fan 75. The numeral 76 indicates inclined baffles which are adapted to be provided for helping to cause the air to travel in the desired manner, and these baffles 76 can be arranged in the most advantageous location. In FIG. 6 the numeral 77 indicates a pump for the water 45 in the tank or chamber 47.

Figure 4:
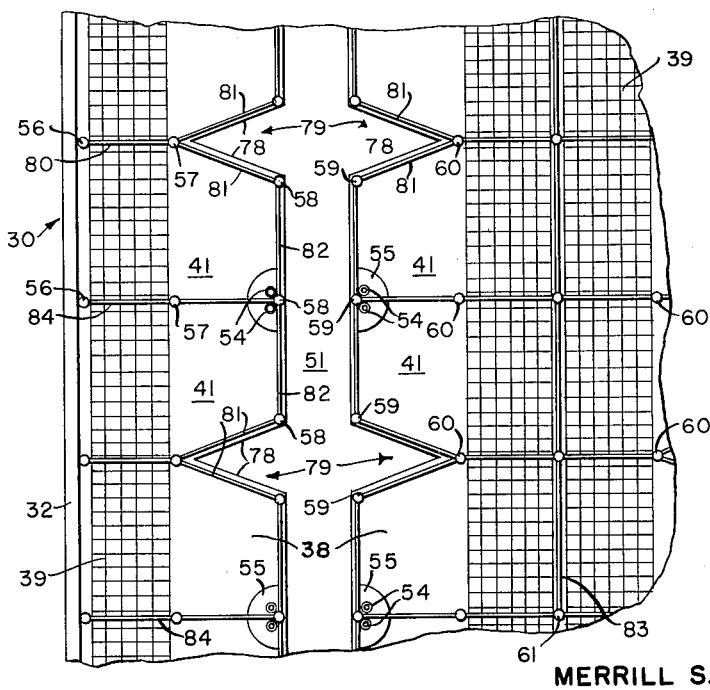
FIG. 4 is a fragmentary enlarged plan view showing certain constructional details of the stalls, and with parts broken away.

The numeral 78 indicates vertically disposed angularly arranged wall pieces or panel sections which are arranged in the form of a V so as to define V shaped work spaces 79, FIG. 4. The stalls 41 are delineated or defined by members or horizontally disposed rods such as rods 80 which extend between the posts 56 and 57 and which are secured thereto, and rods 81 which are secured to posts such as the posts 57 and 58, and other rods or frame pieces 82, 83 and 84 are adapted to be provided for maintaining the cows in their individual stalls and these rods or frame pieces may be removably mounted.

As shown in FIG. 6 one or more inclined baffles 85 may be suitably affixed to the bottom wall of the building to help cause the water 45 to be properly agitated. A suitable opening 86 may be arranged adjacent the blower 74 and an inclined partition or baffle 87 is adapted to be arranged contiguous to the opening 86 so that the air will be properly guided through the opening 86 across the top of the water in the chamber 47. Similarly, an opening 88 is adapted to be provided adjacent the blower or fan 75, and an inclined baffle 89 is arranged contiguous to the opening 88 for a purpose similar to that described in conjunction with the baffle 87.

Figure 5:
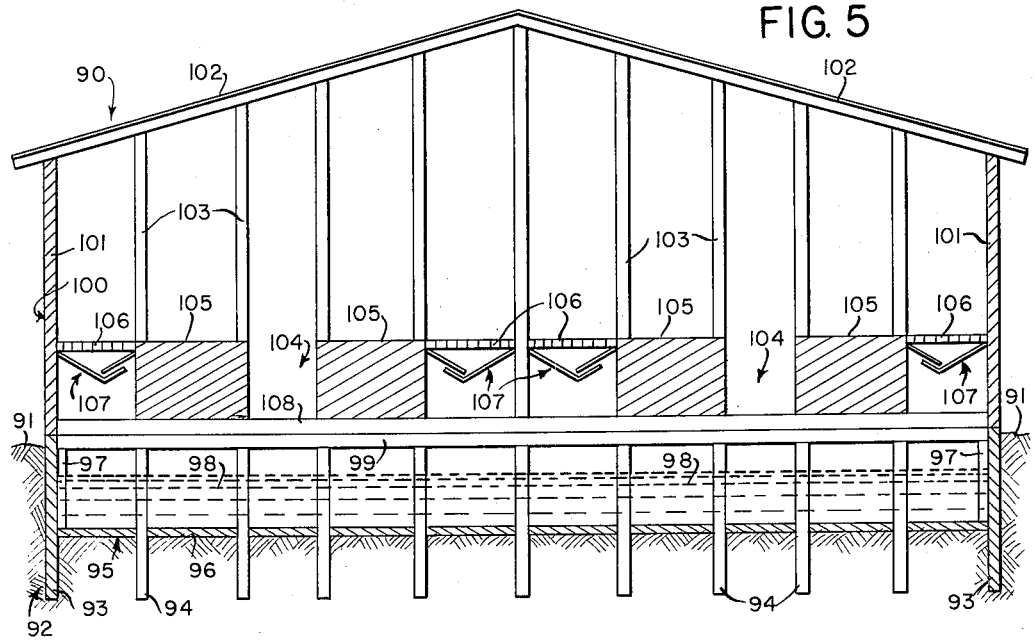
FIG. 5 is a vertical sectional view generally similar to FIG. 3 but illustrating a modification.

Attention is directed to FIG. 5 wherein there is illustrated a modified building that is indicated generally by the numeral 90, and the building 90 may be arranged in conjunction with the ground 91 so that there is provided the foundation 92 which includes members such as the beams 93 and 94, and the foundation 92 may have a tank 95 supported thereby for holding a quantity of liquid or water 98, and the tank 95 is adapted to include a bottom wall 96 and end or side walls 97. Trusses or beams 99 are adapted to be arranged adjacent the top of the foundation 92, and the numeral 100 indicates a building section which may be of the prefabricated type which is placed over the foundation 92, and the building section 100 includes walls 101 as well as a roof 102, and upstanding posts 103, and individual stalls for the animals are adapted to be provided in the building. The numeral 104 indicates work spaces or aisles which are at a lower level than the bottom of the stalls 105, and gratings or slatted floor sections 106 are arranged in the same plane as the stall floors 105, and traps 107 are arranged below the gratings 106, the traps 107 functioning in the same manner as previously described in connection with the traps 42. The beams 108 for the building section 100 are adapted to be arranged above the beams 99 of the foundation 92.

It will therefore be seen that according to the present invention that there has been provided an improved dairy establishment, and in use with the parts arranged as shown in the drawings and in particular as shown in FIGS. 1 through 4 and FIG. 6 of the drawings, it will be seen that a plurality of cows such as the cows 40 are adapted to be arranged in the individual stalls 41, and the animals or cows 40 are adapted to be arranged in rows wherein the cows in each row are in spaced parallel relation with respect to each other, and pairs of rows of cows are adapted to be arranged in head to head relationship as, for example, as shown in FIG. 3. Each cow has its individual stall, and the walk aisles or walk spaces 51 are provided between adjacent rows of cows and stalls so that personnel or workmen can conveniently walk along the surface 51 and readily gain access to the cows 40 as, for example, by means of the spaces 79. The bottoms 38 of the stalls are arranged above the fluid tank or chamber 47 which has a quantity of fluid or liquid therein such as water as indicated by the numeral 45', and the floor section 38 of the stalls has the gratings 39 coplanar therewith so that the waste or excrement from the animals 40 will drop down onto and through the gratings 39 into the traps 42, and water from a suitable source of supply is adapted to be supplied to the traps 42 through the conduits or pipes 46, and as this water overflows from the traps 42 it enters the compartment 47.

Feed is adapted to be supplied from a suitable location such as from the bins 52 and suitable conveyor augers 53 are provided for transporting or conveying the feed from the bins 52 to a plurality of graduated or calibrated tubes 54 which are arranged so that feed will drop by gravity into the feed troughs 55 whereby the individual cows 40 can gain access to an unlimited quantity of feed in the troughs 55, and due to the provision of the graduations or calibrations on the tube 54, an accurate record can be kept of the amount of feed consumed by each individual cow so that the entire operation can be handled on a scientific and accurate basis.

Air is adapted to be pumped from a suitable source of supply through the conduits 50 and this air will circulate down through the members 62 and will pass upwardly through suitable apertures or openings in the horizontal portion 64 of the members 62 whereby this air will bubble up through the water 45' in the chamber 47 and help aerate the waste material which drops down through the traps 42 so that decomposition of this waste material can be accomplished in the most efficient and desirable manner. The traps 42 are constructed so that odors from the waste material in the liquid 45' in the compartment 47 will be kept from circulating through the upper portion of the building 30 above the stalls. That is, the traps 42 permit waste material in the water to drop downwardly but prevent odors and the like from moving upwardly.

The conduits 48 are adapted to be connected to conventional equipment such as vacuum means for supplying vacuum to milking machines for the cows, and the conduits 49 are adapted to be used as conduits or pipe lines whereby the milk from the cows can be conveyed to a suitable locality as, for example, such milk can be conveyed to members or tanks such as the tanks 69 and 70 which are arranged in a convenient location such as the area 68, FIG. 2.

The lower portions of the wall members 37 have the channel member or bushing 65 therein whereby the water or fluid can readily circulate therethrough in order to permit proper agitation and circulation of the material through the system.

As shown in FIG. 6 a suitable system of fans or blowers is adapted to be provided for causing air to circulate throughout the entire building and, for example, a fan or blower 73 may be arranged in an upper end portion of the building for sucking in fresh air from the outside and this air can be made to follow the direction indicated by the arrows in FIG. 6 so that the air will be moved downwardly through the openings 86 by the fan 74 and this air will then flow across the upper surface of the water 45′ in the chamber 47 and this air will then be exhausted out through the openings 88 by means of the fan or blower 75 so that the foul air can be exhausted out through the openings 88 in the desired manner. The baffles 76 help insure that this air will be properly agitated or intermixed with the upper surface of the liquid 45′ in order to insure that the air helps cause the bacterial decomposition and the like in the desired manner.

The plurality of rods such as the rods or frame pieces 80, 81, 82, 83 and 84 are arranged so that the individual stalls are delineated, and these rods or frame pieces may be made removable so as to permit the cows to be moved into and out of the stalls when desired or required. The V-shaped spaces 79 are defined by the vertically disposed wall pieces or panel sections 78, and the provision of the spaces 79 is such that workmen can conveniently gain access to the cows in the stalls, as for example when it is necessary to attach milking equipment to the cows or the like.

In the modification of FIG. 5, the foundation 92 may be suitably formed or provided in the ground 91 and the tank 95 can be built therein, and then prefabricated building sections 90 can be installed over the foundation and tank 95 so as to provide a construction which is adapted to be used in generally the same manner as described in connection with the building 30. Thus, with the cows positioned in the elevated stalls 105, the spaces 104 provide convenient work spaces or walk spaces for the workmen or other personnel, and the gratings 106 are adapted to be used to permit waste or excrement from the cows to drop down into the traps 107, and from the traps 107 the water and waste material is adapted to drop into the tank 95 and the water or liquid in the tank 95 is indicated by the numeral 98, and a forced air circulating system can be used with the arrangement of FIG. 5 similar to that shown in FIG. 6.

Figure 7:
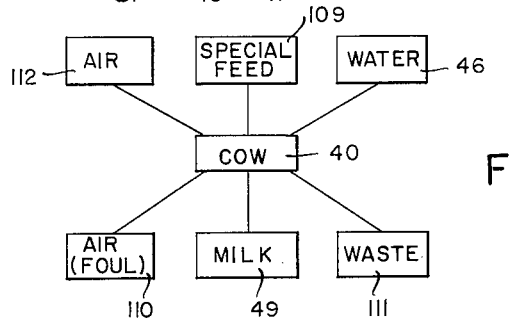
FIG. 7 is a schematic view illustrating the principles of the present invention.

In FIG. 7 there is illustrated schematically the principles of the present invention wherein it will be noted that the numeral 40 indicates the cows and the numeral 112 indicates the fresh air supplied to the cows as, for example, by means of an arrangement such as that shown in FIG. 6, and the numeral 109 indicates the special feed for the cows which is adapted to be supplied from a suitable location such as the bins 62, and the numeral 46 indicates water which may be supplied through the previously described conduits or pipes, and the numeral 110 indicates a means for removal of foul air from the enclosure, and the numeral 49 indicates a means for withdrawal of milk from the cows and the numeral 111 indicates broadly or generally the means for removal of waste or excrement from the cows. As shown in FIG. 6, not only do fans 73, 74 and 75 function to cause air to circulate through the enclosure in order to help aid in bacterial decomposition of the waste material, but in addition this arrangement provides fresh air for the upper or main portion of the building so that the cows and personnel working in the building will have the desired quantity of fresh air at all times.

The present invention is adapted to utilize a controlled nutritional program together with a waste disposal system and an improved ventilation system so that there is provided an automated dairy establishment. The provision of the recesses 79 having the configuration as illustrated provides a tapered stall feature and the stalls are adapted to be arranged in an elevated location and the stalls may be arranged in tandem or parallel relation wherein the cows may be maintained in permanent confined caged enclosures. In FIG. 3 a septic tank is shown as an integral part of the barn or building section, and the walls 32 extend from the bottom 31 to the roof 35, while in FIG. 5 the tank 95 and foundation 92 are separate from the building or barn section 100.

Thus, with the present invention there is created an environment in which animals such as cows may be handled more economically, and the building is equipped with automatic manure disposal as well as with an automatic ventilation and feeding system, and the ventilation system is adapted to maintain the oxygen level of the air in the building at the proper degree or level and by keeping the temperature relatively constant in the building, the animals will not be subjected to stresses that are often prevalent in localities where the cows are not confined.

The building itself may be made up of mobile sections which can be conventionally fastened together at the site, and such mobile sections may be set and secured in place on and above the pier posts of the foundation and fastened together at the top, and the pier foundation under the cow holding sections is adapted to have the dirt excavated therefrom. The construction of the building is such that the milk operator can readily gain access to all necessary parts of the stalls. One or more circulating pumps such as the pumps 77 are adapted to be used to agitate the liquid 45′ in the septic tank 47. Suitable doors are adapted to be provided whereby the cows can move into and out of the stalls over the grated areas when necessary.

The ventilation system is used to supply air to the cow area and also is adapted to be used for supplying air to the septic tank area for aerobic digestion of waste solids and also helps in the drying and evaporation of the tank liquid to eliminate overflow. Also, this arrangement can be used for supplying heat by conventional means to the septic tank for increased digestive bacteria action and this is particularly important during the winter. The ventilation system is also advantageous in warmer periods such as in the summer. In certain cold climates it may be impossible to have enough air movement for complete evaporation of the tank liquid and if this occurs, a conventional settling tank can be placed at the end of the building for the overflow, and the effluent from the settling tank can be run into a sewer or other suitable outlet. The circulating pump 77 is adapted to be arranged in the cow section for easy access thereto.

In addition the feed that is supplied to the cows has a low fiber content so that it produces a low fiber waste whereby there will be less digestion needed in the septic tank and there will be no bedding, hay and the like to get in the septic tank. Also, the unlimited self feeding system (24-hour access) gives more efficient and complete digestion by the cows of the special low fiber feed which is processed for unlimited self feeding of dairy cows so that the self feeding system makes for a still lower fiber waste in the septic tank.

The milk that is produced in the establishment of the present invention will be of improved quality since it will be produced under controlled conditions and will have maximum cleanliness, and wherein there is provided automatic unlimited self feeding which results in labor saving and wherein the milk will have greater nutritional value, the feed that is supplied to the cows being processed within critical areas. There is also the labor saving automatic waste disposal, the elevated cow stalls which permit labor savings, the waste traps to prevent return of odors, and improved sanitation since the cow stalls can be kept cleaner so that there will be cleaner milk available. In addition there is better and cleaner ventilation and no hay dust, no bedding dust, and no silage odors, and there will be a better flavored milk and there will be less dust, dirt and the like.

The building is adapted to be arranged in a convenient location such as in populated areas due to the closed centralized building, and milk can be supplied to the consumers from the cows in the shortest possible time so as to assure the freshest flavor as the chief factor in milk flavor is the length of time between production and use. Thus, the building location in populated areas is of primary importance for retail consumers as well as for producers, and the centralized integrated system permits the operator to devote full time to production, care and handling of the milk, and wherein the operator can milk and care for an increased number of cows. Thus, the milk is produced in a safe wholesome manner with improved qualities and a cleaner condition and with a lower than usual bacteria count since it does not have the disadvantages of conventional systems, and in addition the milk does not require pasturization or further treatment for consumer consumption and without pasturization the milk will contain all natural vitamins and minerals. Sanitation and nutritional factors in the milk production are controlled and accomplished at the source of production.

With the present invention there is provided a self feeding arrangement in conjunction with a means for measuring the cow's feed consumption for a previous or expired period of time. The tapered stall cutouts or recesses 74 in conjunction with the areas 51 provide the most efficient use of the work space for the operator. The feed that is used is adapted to be a blended feed and carries the proper amount of digestible nutrients per pound of dry matter (volume consistency) that can be self fed to dairy cows, and the feed has a constant uniform nutritive ratio and the cows can eat as much feed as desired and the cow will adjust its intake of feed in accordance with her body condition and milk production demands as when in pasture.

The automatic waste disposal in conjunction with the ventilation system of the present invention has been described and illustrated herein in conjunction with a building or barn using air movement to bring about decomposition and evaporation, and this construction is also applicable to other types of buildings such as houses, factories and the like wherein waste disposal is needed. Also, by different arrangement of the grate areas, and larger areas, livestock other than dairy cows can be kept in the building to provide them with self feeding and waste disposal. By self feeding a complete ration to dairy cattle, there will be provided a saving in time, labor and equipment.

With the automated centralized operation of the present invention, there will be important advantages to the producer-operator as well as to the consumer as, for example, these advantages will reside in improved or superior sanitation facilities, better nutrition, and improved location since the building design and construction permits its erection in populated areas, and wherein milk can be sold at retail cash-and-carry prices, and there will be improved economies due to the greater labor returns. The integrated system also means that no farm land is needed for the cows, since the animals are confined, less square footage per cow is needed, and wherein there is improved sanitation, and retail sales in populated areas can be accomplished so that better profit returns are insured and other features of importance are the self feeding arrangement, the manure handling system and the milk handling and sales arrangement. The elevated stalls of the present invention are adapted to be used as permanent stalls for the cows and are not merely to contain the cows during milking periods. The elevated stalls permit automatic self feeding, as well as automatic manure dissipation or digestion and disposal, and also provides permanent elevated milking positions for the operators so that it is not necessary to chase the cows. The buildings can be located in small mid-city lots surrounded by retail customers in close proximity and the present invention thus comprises a combination of elements brought together in a new milk production and marketing system and an integrated cash-and-carry milk market arrangement.

The feed for the cows is adapted to be supplied in unlimited quantity to the cows for self feeding and the feed is adapted to be blended within critical nutritional areas and consists of crude protein, T.D.N., fat, fiber, and a nutritive ratio of the proper amount.

The following is given as an example of the critical area limitations for the feed that is used:

| | |
|---|---|
| Crude Protein, percent | 4 to 24 |
| Fat, percent | 0 to 10 |
| Total Digestible Nutrients, percent | 30 to 90 |
| Fiber, percent | 5 to 26 |
| Nutritive ratio | 1:2.0 to 1:12.0 |
| Weight by volume (dry) lbs. per quart | 0.4 to 2.0 |
| Ingredient length, inch | 0 to 1 |

According to the present invention it will be seen that there has been provided a dairy establishment wherein there is provided a means for processing and blending and feeding of a specific feed whereby the animals have continuous access to an unlimited supply of one specific feed processed and blended within critical areas and limitations, and wherein there is provided a means for measuring the cow's consumption of feed for a prior predetermined period of time, and there is also provided a means whereby the feed can be provided so that manual and/or mechanical measurement of the feed is eliminated. The elevated stall arrangement permits complete self feeding, complete milking and complete care of the cows. By providing feed blended within the critical areas, the nutritional and volume consistency thereof will make the cow adjust its feed intake to its biological needs when given continuous access to an unlimited supply of the feed. There is also provided the stall construction which permits immediate removal of cows' waste from the immediate area of the cows. In addition, the animal is provided with a uniform nutritional diet with a constant specific nutritive ratio within critical areas whereby more efficient feed digestion is accomplished. In the dairy establishment of the present invention, there is provided a means for heating, aerating, agitating and evaporating the liquid waste disposal in conjunction with the ventilation system. Also, the posterior end of the animal is kept away from the caretaker, milking equipment and heads of other adjoining animals. The building is constructed so that it has smooth floored permanent elevated stalls without gutter depressions so that there will be less injuries. The construction also has the tight floor above the liquid waste disposal which contains the gutter trap seals. Also, all animals are provided with an identical and uniform year-round controlled nutrition in an animal self feeding arrangement, and with the elevated stalls, the animals' waste material is continuously removed from the area of the cows to the waste disposal area.

With further reference to the building, a clear span arrangement is adapted to be used which is self supporting over the tank and wherein there is provided two floor levels. The building may be made so that the load is carried by reinforced roof members and trusses can be used wherever desired or required. Thus, lightweight lace trussing can be used so that an all-steel building can be conveniently provided, and the suspended building with suspended cow stalls may be used to provide a clear span underneath for the septic tank area. Wall columns may go from the eave to the bottom of the tank and concrete and the like can be dispensed with. Stall posts can serve as tie rods, and an air space such as the air space between the top of the water 45' and the beams thereabove as shown in FIG. 6, may be used as an air space for moving air with the ventilation system over the septic tank.

The present invention provides labor savings and reduced effort in the handling of the feed for the cows, as well as reduced effort in the handling of the waste material and disposal thereof, and also provides reduced effort in the milking of the cows due to their being in an elevated position.

As shown in the drawings the building is adapted to have the animals therein at all times so that the animals never leave the stalls wherein there is provided a self-contained construction. The elevated stalls assist in the milking operation and the structure of the feed system for providing a continuous supply of feed to the animals, and each stall has a grating to permit the waste material from the animals to fall down into the waste system through the traps, and the waste tank or septic tank has air added to it as, for example, through the number 62 and by means of the fans or blowers so as to aerate the waste material which accelerates bacteriological decomposition. The building can be made in preconstructed sections and conventionally joined together at the building site as in the manner of FIG. 5 wherein the base and tank can be constructed at the site, and the building sections can be manufactured at a remote location and placed thereon.

In the arrangement shown in FIG. 6, the temperature within the barn or building may be maintained at a substantially constant level all year round, and circulation of air is caused by the blowers or fans wherein the air will travel across the water 45′ in the tank area 47 to accelerate decomposition of the waste material and to assist in the evaporation of the liquid, and subsequently the air discharging through the opening 88 may be discharged into the atmosphere or to a remote location.

As shown in FIG. 2, a plurality of building sections may be provided and these may be of the prefabricated or prebuilt sectional type and these sections are indicated respectively by the letters A, B, C, D, and E. The front section A may contain milk handling equipment 68, a sales area 67, and perhaps a feed storage area, and the other sections B, C, D and E contain cows, and eight cows may be arranged in each section and the sections may be of a suitable size such as 10′ x 50′ in dimensions, and the sections can be made smaller or larger as desired or required. Thus, the four sections B, C, D and E can be integrated or assembled into a barn as shown in FIG. 2 so as to hold thirty-two cows in elevated stalls and the stalls are arranged over a waste tank. All of the sections except the section E may have both sides thereof open.

In FIG. 3 the tank is adapted to be arranged in close proximity to the cows so that there will be a minimum of air space below the cows. Also, with further regard to FIG. 3, this may illustrate an arrangement that could be set below ground, or above ground level, and may also be incorporated in a conventional trailer or mobile building section. This can also be used as a conventional barn on a farm for keeping cows therein.

The present invention is adapted to provide a means for mobile building sections or prefabricated sections to be conventionally interlocked and interconnected into a dairy building, as well as providing a means for an elevated animal area or stall over a septic tank, or with the tank as part of the building structure, and may include head-to-head arrangement and provides a complete animal care system therein, and there is also provided a tapered cut-out parallel stall arrangement. The present invention also provides means for placing the piping and equipment beneath the stall platforms, and the elevated stalls provide a means for structural support of the building sections and the elevated stalls provide a means for automatic waste disposal and also provide a means in conjunction with or containing therein the waste disposal system. The present invention also includes or provides a means for a smooth level platform area in a permanent stall and also provides a means for eliminating hay and bedding in the cow area and animal waste.

The present invention also provides a means for aeration, agitation, heating and evaporation of a septic tank within a building structure in conjunction with the building's ventilation system and also provides a means of incorporating a waste disposal system into a structure and provides a means for a waste disposal system as part or in conjunction with an elevated stall, and wherein the stall provides a means as the superstructure of a building section or building proper. Also it provides a means for prompt continuous movement of the animal's waste material to the septic tank providing better waste disposal and cleaner cows, and also provides a means for dual use of ventilating system and provides a means for a gutter trap, and also provides a means for moving air from the upper structure or building to a fluid or septic tank compartment area for sewage treatment and evaporation thereof.

It will be seen that according to the present invention there has been provided mobile building sections and/or prefabricated sections, providing means for integrating the same into a permanent establishment with a complete animal care system therein, and there is also provided integrating mobile building sections providing means for livestock housing and care, product handling and sales, together with an integrating mobile building section that provide means for animal self-feeding, for stalls and supporting structure and a waste disposal system therein. The building structure provides a means for incorporating a waste disposal system in the structure thereof, and there is provided a dairy establishment which provides control means for identical and uniform year-round animal nutritional programs. Also, the building structure provides means for moving air from the upper structure thereof to the fluid or septic tank compartment area for sewage treatment and evaporation thereof, and there is also provided an elevated cow stall arrangement that provides means for continuous automatic self-feeding of the cows therein, and the elevated cow stalls provide a means for automatic disposal of the animal's waste, and the elevated stalls also provide a means for containing therein a waste disposal system.

Minor changes in shape, size and rearrangement of details coming within the field of invention claimed may be resorted to in actual practice, if desired.

What is claimed is:

1. In an agricultural establishment, a building for confining live stock, elevated stalls in the building, a fluid compartment below said stalls providing a septic tank, gratings above said septic tank, and liquid holding means comprising water traps below said gratings and above said septic tank, and work and walk aisles arranged contiguous to the stalls and positioned at a lower level than the bottom of the stalls.

2. The structure as defined in claim 1, and further including means providing areas for product preparation and product sales.

3. In an agricultural establishment, a foundation, a building section above said foundation, a fluid tank providing a septic tank, elevated pairs of row stalls in the building section separated by aisles adjacent to and below the lower surface of the front end of the stalls, gratings above the tank, water traps below the gratings, and posts above and contiguous to the stalls, adjacent stalls in said rows being separated at the front end by depressed V-shaped work recesses contiguous with the floor of said aisles and extending toward the rear of said stalls.

4. The structure as defined in claim 3, wherein the agricultural establishment consists of a group of mobile structures.

5. In an agricultural establishment, a stall with an elevated bed, a fluid excrement holding tank below said elevated bed providing a septic tank, grating in said elevated bed, a water trap below said grating, said stall having one side at about a 90° inside angle with the front of the stall and the opposing side of the stall having greater than a 90° inside angle with the front of the stall and defining an animal area inside the stall and a work area between adjacent stalls.

6. The structure as defined in claim 1, wherein the air above the stalls is moved down and through the fluid compartment below the stalls to provide for the transfer of body heat from the stalls to the septic fluid compartment.

7. In an agricultural establishment, a stall with an elevated bed, grating in said elevated bed, said stall having one side at about a 90 degree inside angle with the front of the stall and the opposing side of the stall having greater than a 90 degree inside angle with the front of the stall and defining an animal area inside the stall and a work area between adjacent stalls.

8. The structure as defined in claim 7, and further including means providing a fluid excrement holding tank below said elevated bed providing a septic tank, and a water trap below said grating in said elevated stall bed.

References Cited by the Examiner

UNITED STATES PATENTS

| | | | |
|---|---|---|---|
| 594,785 | 11/1897 | Fouzer | 119—53 |
| 1,981,418 | 11/1934 | Kreutzer | 119—16 |
| 2,081,947 | 6/1937 | McCornack | 119—14.03 |
| 2,358,000 | 9/1944 | Cornell | 119—14.04 |
| 2,881,733 | 4/1959 | Young et al. | 119—15 |
| 2,969,039 | 1/1961 | Golay | 119—14.03 |
| 2,969,040 | 1/1961 | Siptrott | 119—21 |
| 3,019,763 | 2/1962 | Ferris | 119—14.03 |
| 3,137,270 | 6/1964 | Rigterink et al. | 119—16 |
| 3,148,663 | 9/1964 | Conover | 119—28 X |

OTHER REFERENCES

Iowa Farm Science: March 1962, vol. 16, No. 9, pages 136, 137.

Modern Farm Building, by A. Hopkins: Dec. 12, 1913, pages 156–161.

Proc. Am. Soc. Animal Production, 31, pages 40–47; 1938 Chem. Abstr., 33, #50796, 1939.

SAMUEL KOREN, *Primary Examiner.*

ALRICH F. MEDBERY, *Examiner.*